(12) United States Patent
Panei

(10) Patent No.: US 8,532,643 B2
(45) Date of Patent: Sep. 10, 2013

(54) MOBILE PHONE COMPRISING A STREAMING SERVER WITH ACTIVATION MEANS FOR ACTIVATING DOWNLOADING OF A FILE FOR STREAMING THEREOF

(75) Inventor: Fabien Panei, Chapareillan (FR)

(73) Assignee: Myriad Group AG, Zurich (CH)

( * ) Notice: Subject to any disclaimer, the term of this patent is extended or adjusted under 35 U.S.C. 154(b) by 0 days.

(21) Appl. No.: 13/136,247

(22) Filed: Jul. 27, 2011

(65) Prior Publication Data
US 2012/0064879 A1 Mar. 15, 2012

(30) Foreign Application Priority Data
Jul. 29, 2010 (FR) ...................................... 10 56257

(51) Int. Cl.
*H04W 4/18* (2009.01)
(52) U.S. Cl.
USPC ..................... 455/419; 455/414.4; 455/556.2; 370/395.5; 370/425
(58) Field of Classification Search
USPC .......... 455/419, 414, 3.06, 414.4, 566, 556.2; 709/217, 206, 241, 219, 231, 246; 345/173; 370/395, 395.5, 401, 425; 375/240; 379/246; 725/31
See application file for complete search history.

(56) References Cited

U.S. PATENT DOCUMENTS

| | | | | |
|---|---|---|---|---|
| 5,673,080 | A * | 9/1997 | Biggs et al. | 348/14.09 |
| 5,793,413 | A * | 8/1998 | Hylton et al. | 725/81 |
| 2003/0187954 | A1 * | 10/2003 | Wen et al. | 709/219 |
| 2005/0005025 | A1 * | 1/2005 | Harville et al. | 709/241 |
| 2007/0191070 | A1 * | 8/2007 | Rao | 455/566 |
| 2007/0201484 | A1 * | 8/2007 | Kenrick et al. | 370/395.5 |
| 2007/0283048 | A1 * | 12/2007 | Theimer et al. | 709/246 |
| 2008/0247528 | A1 * | 10/2008 | Charish | 379/202.01 |
| 2011/0055864 | A1 * | 3/2011 | Shah et al. | 725/31 |

FOREIGN PATENT DOCUMENTS

| | | |
|---|---|---|
| EP | 1 906 666 A2 | 4/2008 |
| JP | 2009258916 | 11/2009 |
| WO | WO 2008143493 A2 * | 11/2008 |

OTHER PUBLICATIONS

Jeya, Rajendram Alan Rajendram, Certified priority document, PCT /MY2008/000046, Filing date: May 24, 2007, All pages.*
Healey et al.:"CES Beam from the phone to the TV screen," LA times, Jan. 9, 2010, pp. 1-2.
Alexander Grunder:"Smartphone Version of Twonky Media's DLNA/UPNP Server now available," e Home Upgrade, Jan. 7, 2010.
Anonymous:"Twonkey Mobile Apps," Twonkey (Online), 2010, p. 2 pp.

(Continued)

*Primary Examiner* — Mahendra Patel
(74) *Attorney, Agent, or Firm* — Davidson, Davidson & Kappel, LLC

(57) ABSTRACT

A mobile phone is provided. The mobile phone includes a first buffer memory, a downloader for downloading a data file from a web server in the first buffer memory, the file being accessible at a web address on the web server, the downloader being connected to the first buffer memory, and a streaming server for streaming data to a remote client equipment according to a predetermined network protocol, the streaming server being connected to the first buffer memory. The streaming server is adapted to be connected to the remote client equipment via a data link and is adapted to receive, from the remote client equipment, a data streaming request. The streaming server includes an activater for activating the downloader, the activater being adapted to activate the downloading of the data file.

15 Claims, 4 Drawing Sheets

(56) References Cited

OTHER PUBLICATIONS

Anonymos:"Twonkeymedia goes mobile with android launch and ces," Twonkey (Online), Jan. 7, 2010, p. 2pp.

Wimberly: "Twonkeyserver Mobile: media server in your pocket," Twonkey (Online), Jan. 8, 2010.
Anonymous:"Samsung Galaxy S GT-19000 quick start guide," Samsung (Online); Jul. 1, 2010, pp. 1 to 58.

\* cited by examiner

MOBILE PHONE COMPRISING A STREAMING SERVER WITH ACTIVATION MEANS FOR ACTIVATING DOWNLOADING OF A FILE FOR STREAMING THEREOF

This claims the benefit of French Patent Application FR 10 56257, filed Jul. 29, 2010 and hereby incorporated by reference herein.

The present invention relates to a mobile phone of the type comprising:

a first buffer memory, a downloading means for downloading a data file from a web server in the first buffer memory, the file being accessible at a web address on the web server, the downloading means being connected to the first buffer memory, a streaming server for streaming data to a remote client equipment according to a predetermined network protocol, the streaming server being connected to the first buffer memory, the streaming server being adapted to be connected to the remote client equipment via a data link and to receive, from the remote client equipment, a data streaming request.

The invention also relates to a local data communication network including such a mobile phone and remote client equipment connected to the mobile phone via a data link, the mobile phone and the remote client equipment being adapted to communicate using a predetermined network protocol.

BACKGROUND

A mobile phone of the aforementioned type is known. The mobile phone includes a streaming server generally compatible with the UPnP (Universal Plug and Play) network protocol, or respectively with the DLNA (Digital Living Network Alliance) interoperability standard, the server then being called a UPnP server or DLNA server, respectively. Such a server makes it possible to stream media recorded in an internal memory of the phone to a remote client equipment also compatible with the UPnP network protocol, or with the DLNA standard. The streamed media includes audio and/or video data. The mobile phone also comprises a web browser including a downloading means for downloading a file from a web server into its internal memory.

However, the streaming of a file initially stored in a memory of the web server is relatively tedious to implement by the user on a mobile phone, in particular operating under an Android-type operating system. The user must start by launching the web browser, in order to download the file from the memory of the web server towards its own memory. This operation in particular requires the user to select the file to be downloaded, and to indicate a location of the internal memory for storing the downloaded file. The user must then select, using a UPnP or DLNA controller, respectively, the downloaded file to be streamed by the streaming server.

SUMMARY OF THE INVENTION

It is an object of the present invention to provide a mobile phone comprising a streaming server and a downloading means for downloading a file from a web server, making it possible to facilitate the streaming of a file initially stored in a memory of the web server.

The present invention provides a mobile phone of the aforementioned type, wherein the streaming server includes an activation means for activating the download means, said activation means being adapted to activate the downloading of said data file.

According to other embodiments, the mobile phone comprises one or more of the following features, considered alone or according to all technically possible combinations:

the file includes a plurality of data blocks, and the downloading means is adapted to download, block by block, the file into the first buffer memory, and the streaming server is adapted to send the remote client equipment at least one data block from the first buffer memory, in the absence of downloading all of the data blocks of the file;

the streaming server includes a transmission means according to the predetermined network protocol and a control member for said transmission means, the control member being adapted to send the transmission means a control signal for the transmission to the remote client equipment of each of the downloaded blocks, before reception of the respective next downloaded block;

the mobile phone also comprises:

a conversion means for converting data from a first format to a second format, the file downloaded from the web server being in the first format, the conversion means being connected to output of the first buffer memory, a second buffer memory connected to output from the conversion means and adapted to store the data converted into the second format, in which the streaming server includes a control means for controlling the conversion means, adapted to send a control signal for the conversion of the file;

the conversion means is adapted to convert the file block by block, and the streaming server is connected to the second buffer memory, and is adapted to send the remote client equipment at least one converted block from the second buffer memory, in the absence of the conversion of all of the data blocks of the file;

the conversion means comprises a transcoding means, the first and second formats including image, or audio and/or video attributes, and said image, or audio and/or video attributes of the second format being different from those of the first format;

the conversion means comprises a decrypting means, the first format corresponding to the encrypted data;

the conversion means comprises an encrypting means, the second format corresponding to encrypted data;

the mobile phone comprises a reception means for receiving an instantaneous message from a selective message distribution system, the instantaneous message containing the web address of the file on the web server; and the mobile phone comprises a subscribing means for subscribing to an RSS feed, the RSS feed corresponding to the web address of the web server.

The invention also relates to a local data communication network of the aforementioned type, wherein the mobile phone is as defined above.

The invention also relates to a method implemented by a mobile phone comprising a buffer memory, a downloading means for downloading data from a web server, the downloading means being connected to the buffer memory, a streaming server for streaming data to a remote client equipment according to a predetermined network protocol, the streaming server being adapted to be connected to the remote client equipment via a data link and to receive, from the remote client equipment, a data streaming request, the method comprising:

the transmission, by the streaming server, of an activation signal to the downloading means, the download, by the downloading means, of a data file in the buffer memory, upon receipt of said activation signal.

The invention also relates to a computer program product including instructions that, when they are implemented by a computer incorporated into a mobile phone, implements the method as defined above.

BRIEF DESCRIPTION OF THE DRAWINGS

These features and advantages of the invention will appear upon reading the following description, provided solely as an example, and done in reference to the appended drawings, in which.

DETAILED DESCRIPTION

The invention is in particular applicable to a mobile phone using the Android® operating system by Google. Alternatively, the invention applies to a mobile phone operating under any operating system of the same type as the Android® operating system.

Figure 1:
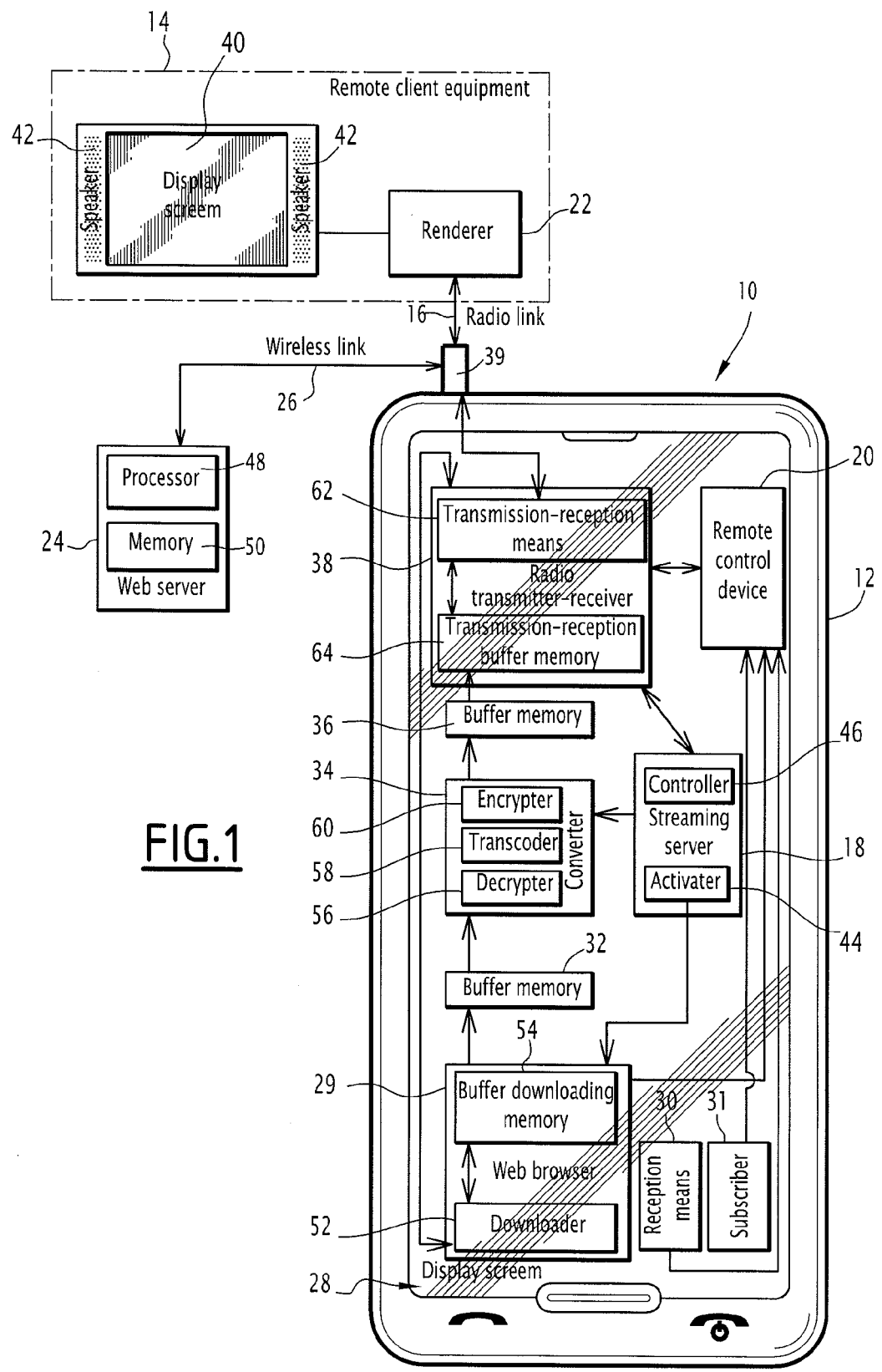
FIG. 1 is a diagrammatic illustration of a local data communication network including a mobile phone according to the invention.

In FIG. 1, a local data communication network 10 comprises a mobile phone 12 and remote client equipment 14 connected to the mobile phone via a first radio link 16. The mobile phone 12 and the remote client equipment 14 are adapted to communicate according to a predetermined network protocol.

The predetermined network protocol is, for example, in compliance with standard ISO/IEC 29341, and is also called UPnP protocol (Universal Plug and Play).

Complementarily, the predetermined network protocol is also in compliance with the DLNA (Digital Living Network Alliance) interoperability standard, specified by the document entitled "The DLNA Networked Device Interoperability Guidelines" dated August 2009.

According to the UPnP standard or the DLNA standard, the local communication network 10 includes a streaming server 18, also called media server, a remote control device 20, and a client device 22, also called renderer.

When the predetermined network protocol is the UPnP protocol, the streaming server 18, the control device 20 and the renderer 22 are respectively called UPnP server, UPnP controller and UPnP client.

When the predetermined network protocol is also in compliance with the DLNA standard, the streaming server 18, the control device 20 and the client device 22 are respectively called DLNA server, DLNA controller and DLNA client.

In the embodiment of FIG. 1, the mobile phone 12, shown in the form of functional modules, includes the streaming server 18 and the control device 20. The remote client equipment 14 includes the client device 22.

Alternatively, the mobile phone includes the streaming server, but does not include the control device, an independent electronic apparatus comprising said control device. The remote client equipment includes the client device.

Alternatively, the mobile phone includes the streaming server, but does not include the control device, the remote client equipment comprising both the control device and the client device.

The mobile phone 12 is also connected to a web server 24 via a second wireless link 26.

The mobile phone 12 comprises a display screen 28, associated with a display means, not shown, for displaying an image on the screen, and a web browser 29.

According to an embodiment shown in FIG. 1, the mobile phone 12 also comprises a reception means 30 for receiving an instantaneous message coming from a selective message distribution system (not shown), and a subscribing means 31 for subscribing to an RSS feed. The selective message distribution system is also known as a PUSH system, the instantaneous message being known as the PUSH message. The instantaneous message is adapted to contain the address of the file on the web server 24, also known under the name URL address (Uniform Resource Locator). In other words, the PUSH message contains the URL of the file. The RSS feed corresponds to the web address of the web server 24 adapted to transmit RSS feeds. More specifically, the RSS feed contains the address where the URL of the file must be analyzed.

The mobile phone 12 includes a first buffer memory 32 connected to an output of a web browser 29, a conversion means 34 for converting a file stored in the first buffer memory from a first format to a second format, the conversion means 34 being connected to an output of the first buffer memory, and a second buffer memory 36 connected to output of the conversion means.

The mobile phone 12 also includes a radio transmitter-receiver 38 and a radio antenna 39.

The mobile phone 12 includes an information processing unit formed, for example, by a data processor associated with a memory, not shown. The processing unit is also called a computer. The memory includes the first and second buffer memories 32, 36 and is adapted to store different software. The streaming server 18, the control device 20, the downloading means 28 and the conversion means 34 respectively include streaming server software, control software, software for web browsing and for downloading data from the web server, and software for converting the file from the first format to the second format.

The remote client equipment 14 includes the client device 22, as well as a video data display screen 40 from the client device and the audio data reproduction speakers 42 from the client device.

The radio link 16 is in compliance with standard IEEE 802.11, also called Wi-Fi™ standard, or standard IEEE 802.15, also called Bluetooth® standard.

The streaming server 18 is connected to the client device 22 of the remote client equipment via the transmitter-receiver 38 and the radio link 16. The streaming server 18, the control device 20 and the client device 22 are adapted to communicate via a hypertext transfer protocol, such as the HTTP protocol (HyperText Transfer Protocol).

The streaming server 18 is adapted to receive, from the client device 22 of the client equipment, a data streaming request, and to transmit in response data to said client device 22 according to the predetermined network protocol.

The streaming server 18 according to the invention includes an activation means 44 for activating the web browser 29 to download a file. The streaming server 18 is adapted to activate the downloading of the file from the web server 24, then transmit the downloaded file to the remote client equipment 14 via a transmitter-receiver 38. The address of the file on the web server 24, i.e. the URL of the file, is obtained by the user during Internet navigation using a browser 29. Alternatively, the URL of the file is contained in the instantaneous message that is adapted to be received by the reception means 30. Alternatively, the address where the URL of the file must be analyzed is contained in the RSS feed to which the subscribing means 31 is adapted to subscribe.

The streaming server 18 also includes a control means 46 for controlling the conversion means, the streaming server 18 being adapted to transmit the downloaded, then converted file to the remote client equipment 14 via the transmitter-receiver 38.

The web server 24 includes an information processing unit formed, for example, by a data processor 48 associated with a memory 50. The memory is adapted to store communication software with the downloading means 29 of the mobile phone.

The web browser 29 is connected to the transmitter-receiver 38, and includes a downloading means 52 for downloading a file from any web server, associated with a buffer downloading memory 54. The buffer downloading memory 54 is connected as an input of the first buffer memory 32. The downloading means 52 is adapted to download, block by block, the data file in the first buffer memory 32, the file including a plurality of data blocks.

Alternatively, the downloading means 52 is independent of the web browser 29. The downloading means 52 includes, for example, an HTTP client. The activation means 44 is then adapted to activate the downloading means 52 to download the file.

The reception means 30, the subscribing means 31, respectively, is adapted to decode the PUSH message, the RSS feed, respectively, so as to recover the URL of the file on the web server 24.

Each file downloaded in the first buffer memory 32 by the downloading means is in a first format, and the client device 22 of the remote client equipment is compatible with a second format. The first and second formats include image, or audio and/or video attributes.

The conversion means 34 is adapted to transcode each downloaded file from the first format to the second format, then store the converted file in the second buffer memory 36. The conversion means 34 is adapted to convert the data file, block by block.

The conversion means 34 comprises a decryption means 56, adapted to decrypt the downloaded file, when the first format corresponds to encrypted data.

The conversion means 34 comprises a transcoding means 58, adapted to transcode the downloaded, possibly decrypted, file when the image, or audio and/or video attributes in the second format are different from those in the first format.

The conversion means 34 comprises an encryption means 60, adapted to encrypt the downloaded file, possibly decrypted and/or transcoded, when the second format corresponds to encrypted data.

The wireless transmitter-receiver 38 includes a transmission-reception means 62 for transmitting and receiving wireless signals and a transmission-reception buffer memory 64. The transmission-reception means 62 is connected to the wireless antenna 39, and the transmission-reception buffer memory 64 is connected between the second buffer memory 36 and the transmission-reception means 62.

According to the invention, the activation means 44 is adapted to activate the downloading of the data file from the web server 24, when the streaming request sent by the client device 22 contains a URL address (Uniform Resource Locator) previously provided by the streaming server 18, corresponding to the file to be downloaded.

According to another aspect of the invention, the streaming server 18 is adapted to send the remote client equipment 14 at least one block of downloaded data from the first buffer memory 32, in the absence of the downloading of all of the data blocks of the file.

The streaming server 18 is, for example, adapted to simultaneously send a plurality of blocks to the remote client equipment. The file is, for example, transmitted in pieces from the streaming server 18 to the remote client equipment 14, the size of each piece being set by the remote client equipment 14. The number of blocks simultaneously transmitted, denoted Nt, is then determined so that the total size of the Nt blocks is greater than or equal to the size of the piece. If the total size of the Nt blocks is larger than the size of the piece, then the last block is cut into two parts, the first part being sent in the current piece, and the second part being sent in the next piece.

The or each data block is sent from the first buffer memory 32 when the first format is identical to the second format, the file then not needing to be converted before streaming to the remote client equipment 14.

The control means 46 is adapted to send the conversion means 34 a control signal for the conversion of a respective block of the file.

The control means 46 is adapted to send the control signals to the conversion means 34, in the absence of downloading of all of the blocks of the file from the web server 24.

According to another aspect of the invention, the streaming server 18 is adapted to send the remote client equipment 14 at least one block that is downloaded, then converted and stored in the second buffer memory 36, in the absence of conversion of all of the blocks of the file.

The or each data block is sent from the second buffer memory 36 when the second format is different from the first format, the file then needing to be converted, block by block, before being streamed to the remote client equipment 14. In that case, each block sent from the remote client equipment 14 is the downloaded block, then converted by the conversion means 34.

The operation of the local transmission network 10 according to the invention will be explained below using FIGS. 2 to 4.

Figure 2:
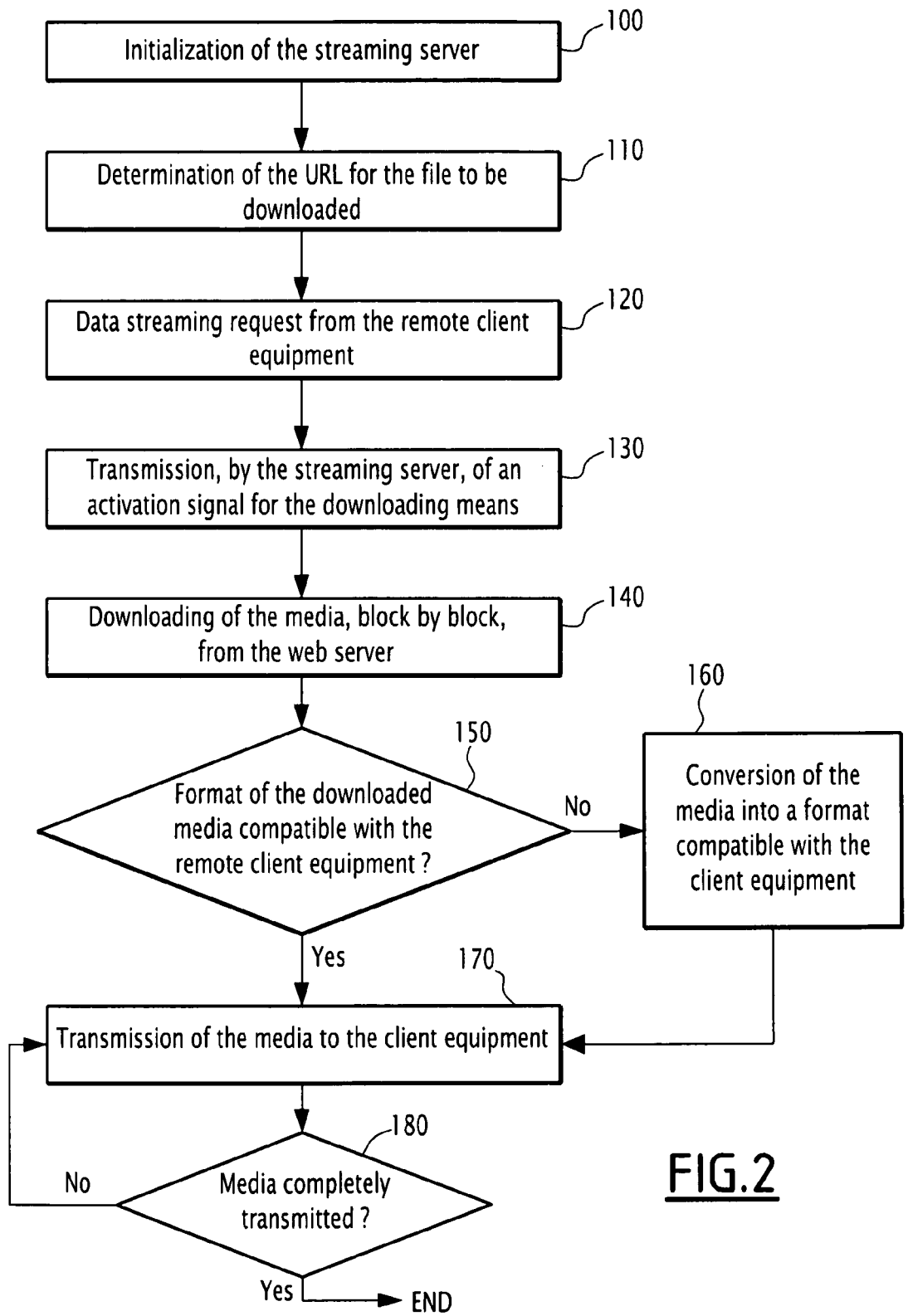
FIG. 2 is a flowchart of a method implemented by the mobile phone of FIG. 1.

FIG. 2 illustrates a method for streaming a file from the server 18 to the remote client equipment 14.

During the initial step 100, the user starts by authorizing the sharing of any type of file from the phone 12, such as an image, a music, or a video, by checking, for example, the respective "Image sharing," "Music sharing," "Video sharing" boxes. The user then activates the streaming server 18 by checking an "Activate server" box.

At the end of this initial step, the streaming server 18 of the phone is ready to transmit, via its activation means 44, activation signals to the downloading means 52, upon receipt by the remote client equipment 14 of a streaming request with a URL corresponding to the web server 24.

The control device 20 also sends a request to the client device 22, so as to obtain the list of formats supported by the client device 22.

After activating the streaming server 18, the web address of the server 24 is determined by the control device 20 in step 110. The user navigates, for example, on the Internet using a browser 29 and selects a file he wishes to stream to the remote client equipment 14, as shown in FIG. 3. The web browser 29 then sends the URL corresponding to the selected file to the control device 20.

Alternatively, the URL of the file to be downloaded is determined during the reception by the reception means 30 of an instantaneous message, the latter being contained in said instantaneous message. In other words, the reception means 30 decodes the PUSH message, in order to recover the URL from the file on the web server 24, then sends the URL for the file to the control device 20.

Alternatively, the URL of the file to be downloaded is determined using the subscription means 31 to an RSS feed selected by the user, the RSS feed containing the address where the URL of the file must be analyzed. In other words, the subscription means 31 decodes the RSS feed, so as to recover the URL of the file on the web server 24, then sends the URL of the file to the control device 20.

Figure 3:
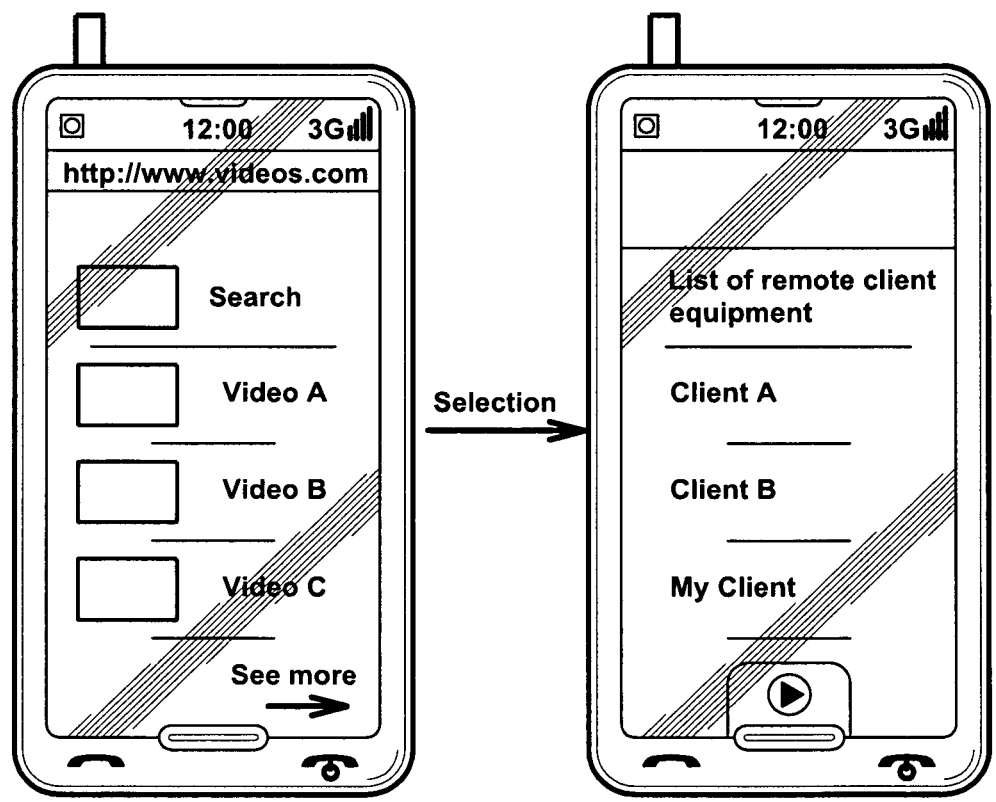
FIG. 3 is a diagrammatic illustration of the man-machine interface of a control device for the local network of FIG. 1 during the steps of selecting a video to stream from among a list of videos contained in a web server, a streaming server from among a list of available local servers, and remote client equipment from among a list of available client equipment, and FIG. 4 diagrammatically shows the conversion of different data packets of a downloaded file before they are streamed by the streaming server.

After determining the URL of the file on the server 24, the user views, in step 120, via the control device 20, the list of available client equipment, and chooses, for example, the remote client equipment 14, called "My client" in the embodiment of FIG. 3. The streaming sever 18 is, for example, imposed by default.

When the user has selected the remote client equipment 14, the control device 20 sends a request to the server 18 in order to have a list of media formats that are likely to be streamed.

In response, the streaming server 18 returns a list of URLs, the first URL corresponding to a default format, and the next URLs corresponding to converted data formats. As a complement to the list of URLs, the streaming server 18 also returns a list of proposed formats, each format being associated with a URL.

The control device 20 then compares the list of different formats proposed by the streaming server 18 with the list of formats supported by the client device 22, and selects a format shared by those two lists. In other words, the selected shared format is the second format previously described. The control device 20 then sends the client device 22 the URL from the list sent by the streaming server 18 and corresponding to the selected shared format.

The client device 22 sends the streaming server 18 a request containing the URL previously received from the control device 20.

The file corresponding to the received URL contained in the memory of the web server 24, the streaming server 18 sends, during step 130, via an activation means 44, an activation signal for the downloading means 52 to download the file from the web server 24.

The downloading means 52 then downloads, during step 140, block by block, the file in the first buffer memory 32. After it is activated by the streaming server 18, the downloading means 52 performs the downloading independently from the streaming server 18 and the conversion means 34, and stores, as it goes along, each downloaded block in the first buffer memory 32.

At the end of the downloading step (step 130), the streaming server 18 determines, in step 150, whether the format of the file being downloaded is compatible with the formats supported by the remote client equipment 14. In other words, the streaming server 18 determines whether the second format is identical to the first format by interpreting the received URL.

When the format of the file being downloaded is not compatible with the formats supported by the remote client equipment 14, i.e. when the second format is different from the first format, the control means 46 sends, in step 160, control signals to the conversion means 34, and the conversion means 34 then converts, block by block, the file from the first format to the second format, then records the converted data packet in the second buffer memory 36. The control means 46 sends the control signals to the conversion means 34 in the absence of downloading of all of the blocks of the file.

When the first format corresponds to encrypted data, the conversion of a respective block of the file includes the decryption of said respective block by the decryption means 56.

When the image or audio and/or video attributes of the second format are different from those of the first format, the conversion of a respective block of the file includes the audio and/or video transcoding of said respective block by the transcoding means 58. Said respective block may have been decrypted beforehand by the decryption means 56.

When the second format corresponds to encrypted data, the conversion of a respective block of the file includes the encryption of said respective block by the encryption means 60. Said respective block may have been decrypted beforehand by the decryption means 56 and/or transcoded beforehand by the transcoding means 58.

At the end of the conversion of the block (step 160), or directly after step 150 when no conversion is necessary, the streaming server 18 determines, in step 170, whether the number of downloaded, and potentially converted, blocks is sufficient to transmit the file to the remote client equipment 14. In other words, the streaming server determines whether the number of downloaded, and potentially converted, blocks is greater than the number Nt of blocks corresponding to the size of the piece to be transmitted to the client device 22.

If the number of downloaded, and potentially converted, blocks is greater than Nt, then the streaming server 18 commands the transmitter-receiver 38 to send the file to the remote client equipment 14. The downloaded, and potentially converted, blocks are then transferred from the second buffer memory 36 towards the transmission-reception buffer memory 64, for their autonomous transmission by the transmission means 62 of the transmitter-receiver.

Figure 4:
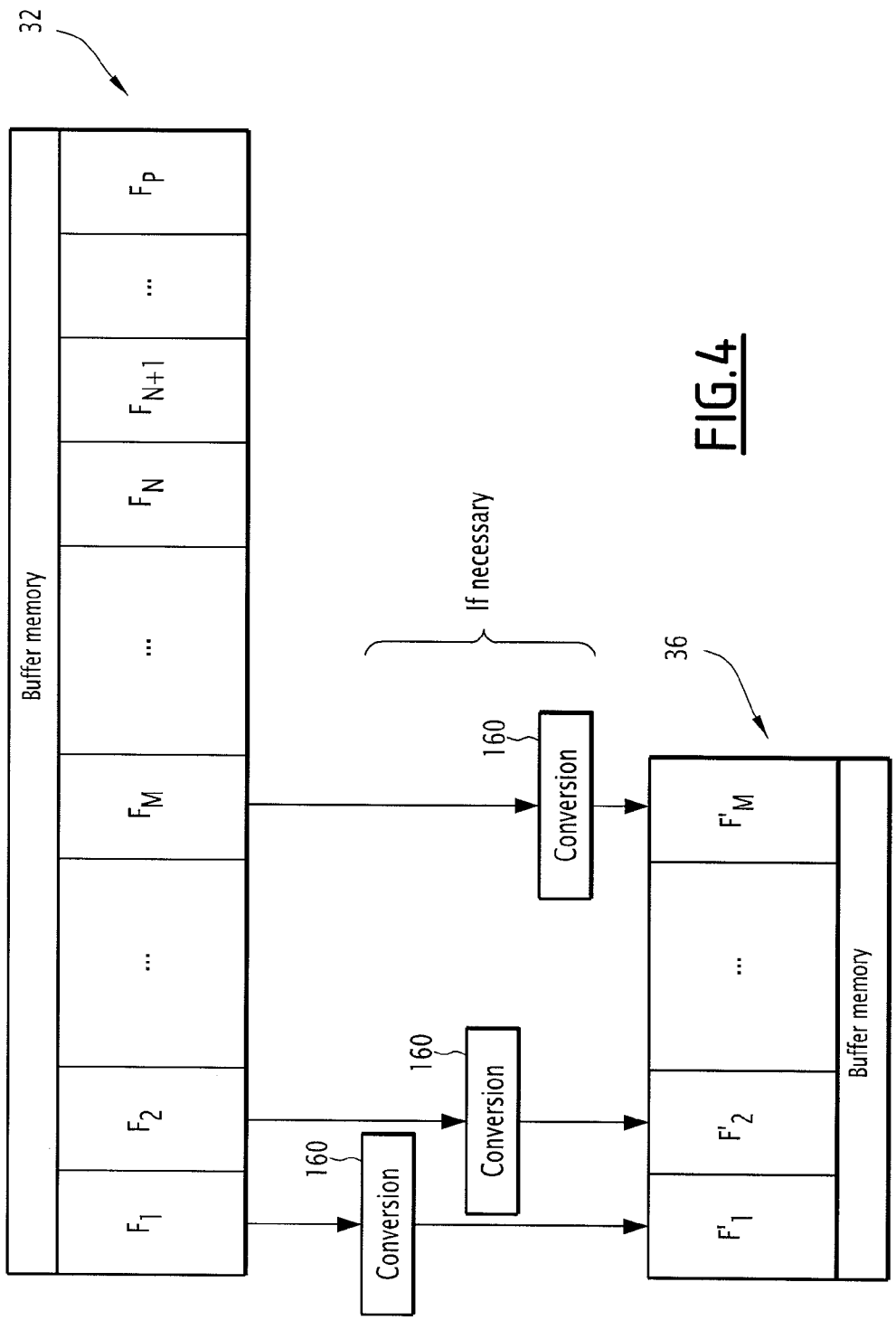

Otherwise, the streaming server 18 waits for the downloading of a sufficient number of blocks or reiterates the conversion step 160 as many times as necessary, as shown in FIG. 4. In the embodiment of FIG. 4, the conversion step 160 has been carried out successively M times. FIG. 4 also shows the storage in the first buffer memory 32 of the data packets F1 to FP of the file before conversion, as well as the storage in the second buffer memory 36 of the M converted blocks F'1 to F'M ready to be streamed to the remote client equipment 14.

After transmission of the downloaded, and possibly converted, data packets of the file, the streaming server 18 lastly verifies, in step 180, that the set of blocks of the file has been transmitted, and returns in the contrary case to the transmission step 170.

The streaming server of the mobile phone 12 according to the invention thus makes it possible to stream a file initially stored in the memory 50 of the web server, without having previously downloaded the file into the memory of the mobile phone 12. In fact, the streaming server includes an activation means 44 for activating the downloading means 52, and the downloading of the file is then done transparently for the user.

Furthermore, the streaming server is adapted to transmit the file, block by block, via the transmitter-receiver 38 to the client equipment 14, in the absence of downloading of the set of blocks of the file. This makes it possible to reduce the wait time for the user, transmitting downloaded blocks to the client equipment 14 as early as possible, without waiting for the entire file to be downloaded.

When the second format is different from the first format, the control means 46 is adapted to send the control signals to the conversion means 34 without waiting for the entire file to have been downloaded. This also makes it possible to reduce the wait time for the user.

One can thus see that the invention makes it possible to propose a mobile phone comprising a streaming server and a downloading means for downloading a file from a web server, making it possible to facilitate the streaming of a file initially stored in a memory of the web server.

The invention claimed is:

1. A mobile phone for downloading a data file from a web server and streaming the data file to a remote client equipment, the mobile phone comprising:
   a first buffer memory;
   a downloader for downloading the data file from the web server into the first buffer memory, the data file being accessible at a web address on the web server, the downloader being connected to the first buffer memory; and
   a streaming server inside the mobile phone for streaming data to the remote client equipment according to a predetermined network protocol, the streaming server being connected to the first buffer memory, the streaming server being adapted to be connected to the remote client equipment via a data link and to receive by the mobile phone, from the remote client equipment, a data streaming request, the streaming server being adapted to send to the remote client equipment at least one data block from the first buffer memory;
   the streaming server being separated from the downloader, the streaming server including an activater for activating the downloader, the activater being adapted to activate the downloading of the data file from the web server.

2. The mobile phone as recited in claim 1 wherein the data file includes a plurality of data blocks, and the downloader is adapted to download, block by block, the file into the first buffer memory, the streaming server being adapted to send to the remote client equipment at least one data block from the first buffer memory, without all of the data blocks of the data file having been downloaded.

3. The mobile phone as recited in claim 2 wherein the streaming server includes a transmitter according to the predetermined network protocol and a controller for the transmitter, the controller being adapted to send the transmitter a control signal for the transmission to the remote client equipment of each of the downloaded blocks, before reception of a respective next downloaded block.

4. The mobile phone as recited in claim 1 further comprising:
   a converter for converting data from a first format to a second format, the data file downloaded from the web server being in the first format, the converter being connected to an output of the first buffer memory; and
   a second buffer memory connected to an output of the converter and adapted to store the data converted into the second format,
   the streaming server including a controller for controlling the converter, adapted to send a control signal for conversion of the data file.

5. The mobile phone as recited in claim 4 wherein the converter is adapted to convert the data file block by block, and the streaming server is connected to the second buffer memory, and is adapted to send the remote client equipment at least one converted block from the second buffer memory, in the absence of the conversion of all of the data blocks of the data file.

6. The mobile phone as recited in claim 4 wherein the converter comprises a transcoder, the first and second formats including image, or audio and/or video attributes, and the image, or audio and/or video attributes of the second format being different from those of the first format.

7. The mobile phone as recited in claim 4 wherein the converter comprises a decrypter, the first format corresponding to the data in encrypted form.

8. The mobile phone as recited in claim 4 wherein the converter comprises an encrypter, the second format corresponding to the data in encrypted form.

9. The mobile phone as recited in claim 1 further comprising a receiver for receiving a PUSH message from a selective message distribution system, the PUSH message containing the web address of the file on the web server.

10. The mobile phone as recited in claim 1 further comprising a subscriber for subscribing to an RSS feed, the RSS feed corresponding to the web address of the web server.

11. A local data communication network comprising: a mobile phone; and a remote client equipment connected to the mobile phone via a data link, the mobile phone and the remote client equipment being adapted to communicate using a predetermined network protocol, the mobile phone as recited in claim 1.

12. A method implemented by a mobile phone, the method comprising:
   transmitting, by a streaming server inside the mobile phone for streaming data to a remote client equipment according to a predetermined network protocol, an activation signal to a downloader of the mobile phone, the downloader being connected to a buffer memory of the mobile phone, the streaming server connecting to the remote client equipment via a data link and receiving by the mobile phone, from the remote client equipment, a data streaming request, the streaming server sending to the remote client equipment at least one data block from the first buffer memory; and
   downloading, by the downloader, a data file in the buffer memory from a web server, upon receipt of the activation signal, the streaming server being separated from the downloader.

13. A computer program product comprising instructions that, when implemented by a computer incorporated into a mobile phone, implements the method as recited in claim 12.

14. The mobile phone as recited in claim 1 further comprising a selection means for a user to select the data file to be downloaded from the web server and streamed to the remote client equipment.

15. The mobile phone as recited in claim 1 wherein the predetermined network protocol is the UPnP protocol, or a protocol derived from the UPnP protocol.

* * * * *